(12) United States Patent
Cormack et al.

(10) Patent No.: US 6,888,976 B2
(45) Date of Patent: May 3, 2005

(54) HITLESS TUNING APPARATUS AND METHODS FOR ADD/DROP FILTERS

(75) Inventors: Robert H. Cormack, Decatur, GA (US); David A. Goldberg, Boulder, CO (US)

(73) Assignee: Micron Optics, Atlanta, GA (US)

( * ) Notice: Subject to any disclaimer, the term of this patent is extended or adjusted under 35 U.S.C. 154(b) by 240 days.

(21) Appl. No.: 10/263,421

(22) Filed: Oct. 2, 2002

(65) Prior Publication Data

US 2003/0063842 A1 Apr. 3, 2003

Related U.S. Application Data

(60) Provisional application No. 60/326,588, filed on Oct. 2, 2001.

(51) Int. Cl.[7] ................................................ G02B 6/26
(52) U.S. Cl. ............................ 385/16; 385/18; 385/22; 385/31
(58) Field of Search ............................ 385/15, 16, 18, 385/22, 24, 27, 31, 39; 398/45, 82, 83, 85

(56) References Cited

U.S. PATENT DOCUMENTS

| | | | | |
|---|---|---|---|---|
| 4,239,331 A | | 12/1980 | Aoyama | |
| 4,893,891 A | | 1/1990 | Fujita et al. | |
| 5,606,439 A | * | 2/1997 | Wu | 349/117 |
| 5,937,115 A | * | 8/1999 | Domash | 385/16 |
| 6,188,817 B1 | * | 2/2001 | Goodfellow | 385/24 |
| 6,192,174 B1 | * | 2/2001 | Lee | 385/24 |
| 6,587,608 B2 | * | 7/2003 | Cormack | 385/16 |
| 6,665,459 B2 | * | 12/2003 | Cush et al. | 385/15 |
| 2002/0171935 A1 | * | 11/2002 | Cormack | 359/498 |

FOREIGN PATENT DOCUMENTS

| | | |
|---|---|---|
| JP | 54114127 | 9/1979 |
| JP | 5639501 | 4/1981 |
| JP | 63175240 | 7/1988 |
| JP | 225823 | 1/1990 |

* cited by examiner

*Primary Examiner*—Diane I. Lee
(74) *Attorney, Agent, or Firm*—Jennifer L. Bales; Macheledt, Bales & Heidmiller, LLP

(57) ABSTRACT

Switch devices for hitless tuning or reconfiguring an add or drop WDM filter. The input light is switched from the filter (where the desired channel is passed and the express channels are reflected) to a mirror where all channels are reflected. The switching is done in a continuous manner such that there is never an interruption in the channels reflected from the filter or mirror. While all channels are being reflected from the mirror, the filter is tuned to a different channel; or alternatively, is replaced by a filter which would drop a different channel. After the filter is tuned to the new channel, the input light is switched from the mirror back to the filter The switch may include a parallelogram prism or two sequential mirrors. The switch and the input beam are translated with respect to each other to switch the light between the filter and the mirror.

16 Claims, 4 Drawing Sheets

HITLESS TUNING APPARATUS AND METHODS FOR ADD/DROP FILTERS

U.S. Pat. No. 6,362,904, issued Mar. 26, 2002 is incorporated herein by reference. Copending patent application Ser. No. 10/126,731, filed Apr. 19, 2002 is incorporated herein by reference. This application claims the benefit of U.S. Provisional Application Ser. No. 60/326,588, filed Oct. 2, 2001, and incorporates it by reference.

BACKGROUND OF THE INVENTION

1. Field of the Invention

The present invention relates to apparatus and methods for switching an input beam of light between two nonadjacent output positions, such that all of the light appears at the output positions before, during and after switching, and no light appears between the positions. In particular, the present invention is a switch useful for tuning, re-configuring, or switching Optical Add/Drop Multiplexers used with Wavelength Division Multiplexed (WDM) optical fiber communication, such that the through signals (those wavelengths neither being dropped or added) are not affected by the tuning, switching, or re-configuration.

2. Description of the Prior Art

In Wavelength Division Multiplexed (WDM) fiber optics communications, one fiber carries many data streams, each on a separate wavelength signal. In networks using WDM, ideally each node should be able to separate out (drop) any wavelength in use on the fiber and re-direct it to a detector or sub-network. At the same time, it is desirable that each node should be able to add data to the fiber on any wavelength channel that is currently unused at the node, either because such wavelength is not present at the node, or because it was just dropped at said node.

In addition, if network nodes are able to switch between dropping a given wavelength channel and not-dropping it fast enough (in a way that does not interrupt other network traffic while switching), then the network controller can time-share a wavelength to several subscribers. This is highly desirable, since many customers do not want or need the full data rate possible on a single wavelength. A fast enough switching time for this application is probably <2 milliseconds. This highly-desirable mode of operation is enabled by several of the techniques taught by this invention.

In today's optical WDM optical networks, nodes are actually implemented in two different ways, neither of which is ideal:

1. Optical to Electronic to Optical (OEO) Conversion: This is the most common (and expensive) method of constructing nodes. All wavelengths coming into the node along the input fiber are demultiplexed into separate channels and detected (i.e., converted to electronic signals). The signals which are not being dropped at the node are used to modulate lasers and the resulting wavelengths are multiplexed back onto the output fiber. The multiplexing/demultiplexing is typically done with either arrays of filters or with diffraction grating techniques.

The advantage of this method is that the node is completely flexible—any wavelength can be dropped or added at the node. In addition, signals may be transferred from one wavelength to another.

The disadvantages of this method are:

a) Expensive hardware components (the detector, electronics, laser, and modulator) are needed for each wavelength on the fiber. This rapidly becomes very expensive as numbers of wavelengths grow.

b) Much of the hardware (detectors, electronics, and laser modulators) are data-rate dependent If the network is upgraded from 2.5 Gigabits/sec to 10 Gigabits/sec per wavelength, for example, all electronics at all nodes must also be expensively upgraded.

2. Fixed Optical Add/Drop Filters: There are, at most, two nodes in a WDM network (the terminal nodes) that need to drop all wavelengths on the fiber—all other nodes (intermediate nodes) usually need to drop or add only a few wavelengths. This can be done inexpensively by passing the fiber through several fixed-wavelength drop/add filters. Only the wavelengths these filters are designed for are dropped or added—all other wavelengths simply continue on with no change. These filters are usually constructed using thin film interference filters or fiber Bragg gratings.

Advantages: This node style is considerable less expensive than an OEO node—filters, electronics, and lasers are only required for the number of wavelengths actually to be dropped at the node. If the wavelengths are being sent on to a sub-network, only the inexpensive filters are needed, and the node is data-rate independent.

Disadvantages: Fixed-wavelength nodes don't allow the network to adjust to varying loads, and make network expansion more difficult. When the network grows complicated enough, "wavelength blocking" occurs: even though the network may be far from it's theoretical carrying capacity, certain pathways are blocked from use as no single wavelength can connect them. The network could be manually re-configured to remove any given block, but this would create other blocked paths during different load conditions. This problem grows rapidly with network complexity. In addition, current fixed-drop technologies cannot be switched on and off without interrupting the rest of the network traffic.

Neither of the above methods of constructing optical add/drop network nodes adequately address the need for networks to be both inexpensive and easily and quickly reconfigurable: the OEO nodes achieve wavelength flexibility at the cost of a very high price and data-rate sensitivity; the fixed wavelength add/drop filter nodes are data-rate insensitive and inexpensive, but are completely inflexible as to the dropped wavelengths. The ideal network node would, therefore, have the following characteristics:

1. The node would be all optical—there would be no optical to electronic conversions. Thus the node would be completely insensitive to data-rate upgrades.

2. The node would have the flexibility to drop (and add) any wavelength on the fiber, and the wavelengths to drop could be changed remotely at any time without data interruption to the rest of the network.

3. The node could be constructed relatively inexpensively, using proven components.

4. The node would have low loss, at least for the passed (undropped) wavelengths, so as to minimize the requirement for expensive optical amplifiers.

Tunable and Reconfigurable Add/Drop Filters

An ideal method of addressing the above problem would be to have a tunable add/drop filter, where any desired wavelength could be dropped and/or added at a given node, simply by tuning the filter to the desired wavelength. A major problem with most proposals for tunable add/drop filters is that they interrupt wavelengths while tuning. That is, if a tunable drop filter is currently dropping channel 3 (for example), and is commanded to tune to channel 12; channels 4 through 11 are momentarily interrupted ("hit") as the filter tunes by. Since optical data rates can be as high as 10 Gigabytes/second on each wavelength, significant data is lost to even a millisecond interruption.

A need remains in the art for improved hitless methods of tuning add drop filters. In particular, a need remains in the art for a light switch that allows hitless tuning of the filter by smoothly switching to reflecting all wavelengths while the filter is tuned.

SUMMARY OF THE INVENTION

The present invention includes a "hitless" method of tuning or reconfiguring an add or drop WDM filter. The input light is switched from the filter (where the desired channel is passed and the express channels are reflected) to a mirror where all channels are reflected. The switching is done in a continuous manner such that there is never an interruption in the channels reflected from the filter or mirror. While all channels are being reflected from the mirror, the filter is tuned to a different channel; or alternatively, is replaced by a filter which would drop a different channel. When the filter is tuned to the new channel, the input light is switched from the mirror back to the filter, dropping the new channel. Since the tuning (or reconfiguration) is done while the beam is reflected from the mirror, no interruption of intermediate channels occurs. Additionally, the beam path length is controlled such that the phase of the reflection from the mirror matches the phase of the reflection from the filter; so that there is no destructive interference of any signals while the input beam is partially reflecting from both the mirror and filter during the switch operation. The invention shows optical means which cause the input beam to move from a filter surface to a mirror surface continuously, without even a momentary interruption of the optical signals.

Apparatus for hitlessly tuning an optical add-drop filter according to the present invention includes an input beam comprising channels of data, a filter for selectively passing one or more channels of data and reflecting one or more channels of data, a reflective surface for reflecting all of the channels of data, and a switch assembly for switching the input beam between the filter and the reflector. The switch assembly includes switch means for switching the input beam between the first and second locations, the switch means positioned to intercept the input beam, and means for translating the switch means and the light beam to selected positions relative to each other wherein in a first selected position all of the light appears in the first location, in a second position part of the light appears in the first location and part of the light appears in the second location and in a third position all of the light appears in the second location, and wherein none of the light appears between the first location and the second location in any of the positions.

In one embodiment, the switch means comprises a parallelogram prism arranged such that the input beam intercepts a first of the sides in the first position, the first side and an adjacent side at a corner in the second position and the adjacent side in the third position.

The prism might be formed from a triangular prism having first, second, and third adjacent surfaces and an axis down the middle parallel to the three adjacent surfaces, wherein the triangular prism was cut across its axis, and wherein the two resulting portions were rotated and rejoined such that the first surface now forms opposite sides of the parallelogram prism, the second surface now forms opposite sides of the parallelogram prism, and the third surface is now joined together.

In another embodiment, the switch means comprises two mirrors arranged to sequentially intercept the input beam in the first position. In the second position, the first mirror intercepts part of the input beam, and part of the input beam passes adjacent to the first mirror. In the third position, all of the light passes adjacent to the first mirror.

This embodiment may include a block of transparent material positioned to intercept the light between the apparatus and either the first location or the second location, the block applying a phase shift to the light passing through it. This block may be rotated to vary the phase shift applied.

DETAILED DESCRIPTION OF THE PREFERRED EMBODIMENT

Thin film interference bandpass filters for telecommunications use work by transmitting the desired wavelength channel and reflecting all other channels. Thin film filters can be tuned by constructing them such that the bandpass wavelength changes over the surface of the filter (linear-variable filters), or by changing the angle of incidence of the input light on the filter (angle-tuned filters). In either case, the use of the present invention to hitlessly switch the input light away from the filter and onto a mirror can be used to construct a hitless-tuned filter. The operation states of such a filter are as follows:

State 1. The filter is passing channel x and reflecting all other channels.

State 2. The input light beam is switched from the filter to a mirror hitlessly by using the apparatus and methods of this invention. In this state, all channels, including channel x, are now reflecting from the mirror and hence returned to the network.

State 3. The filter is tuned to channel y. Since this happens while all channels are being reflected from the mirror, there is no effect on channels x, y, or any other channels.

State 4. The input light beam is switched from the mirror back to the filter hitlessly. The filter is now passing the new channel, y, and reflecting all other channels, including the previously dropped channel, x.

Figure 1A:
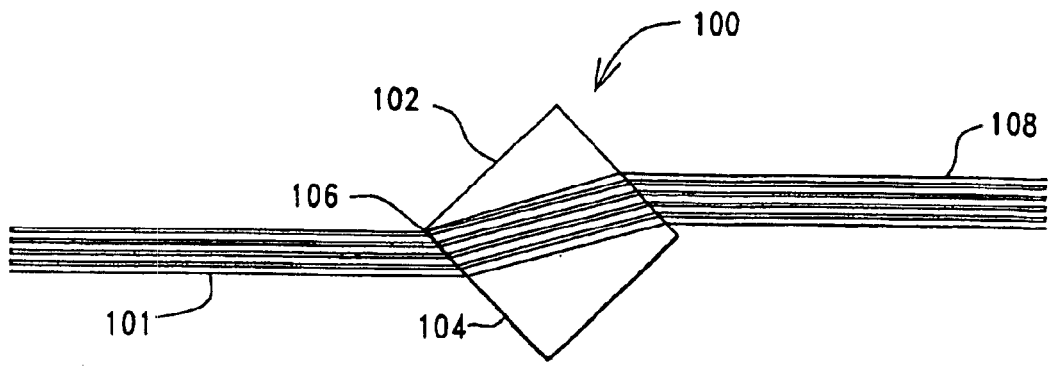
FIGS. 1a, 1b, and 1c are side views of a first embodiment of a beam switching element according to the present invention, the input beam positioned to provide an output beam in an upper position, an in-between position, and a lower position, respectively.
Figure 1B:
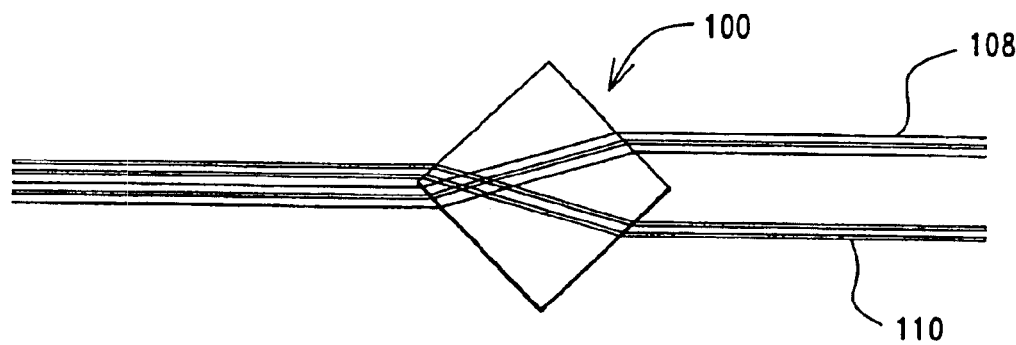
Figure 1C:
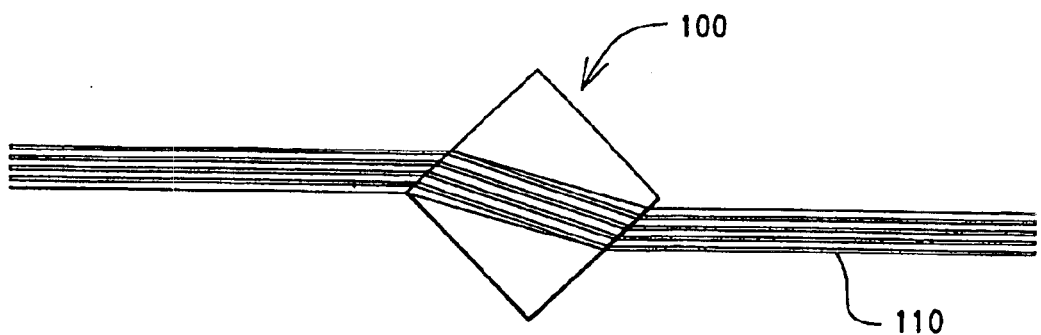

FIGS. 1a–1c are side views of a first embodiment of a beam switching element 100 according to the present invention, the input beam 101 positioned to provide an output beam in an upper path 108, an in between configuration (part of the beam in upper path 108 and part of the beam in lower path 110), and a lower path 110, respectively. One of the two paths, say the upper path 108, provides the output beam to the filter (State 1 and State 4 above) and the lower path 110 (in this example) provides the output beam to the mirror (State 2 and State 3 above) (the filter and the mirror are not shown). FIGS. 1a–1c show how a square or parallelogram cross-section prism may be used to produce a discrete jump in the output position of a collimated beam from incident on a filter to incident on a mirror, by means of either a continuous translation of the input beam, or translating the prism through the beam.

FIG. 1a shows the switch with the beam in the upper position, FIG. 1b shows the switch in the halfway position, and FIG. 1c shows the switch with the beam in the (fully switched) lower position. In FIG. 1a, the beam intercepts a first side 104 of the parallelogram prism. In FIG. 1b, the input beam intercepts both the first side 104 and an adjacent side 102 of the prism 100, at the corner 106 formed by the two sides. In FIG. 1c, the beam intercepts the adjacent side 102 of the prism. The movement of the output beam can be achieved either by translating the input beam through a small continuous range, or, equivalently, by translating the prism through the input beam. In any case, no light is ever incident between the upper and lower beam positions.

Figure 2A:
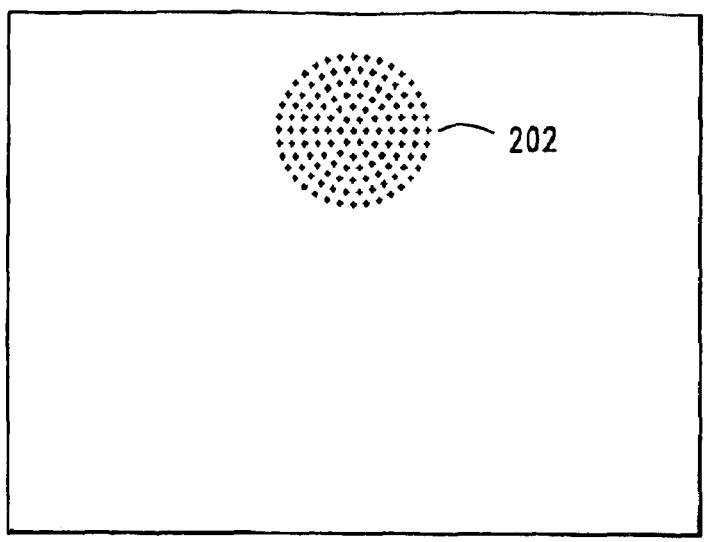
FIGS. 2a, 2b, and 2c are diagrams illustrating the output beam of FIGS. 1a–1c in an upper position, an in between position, and a lower position, respectively.
Figure 2B:
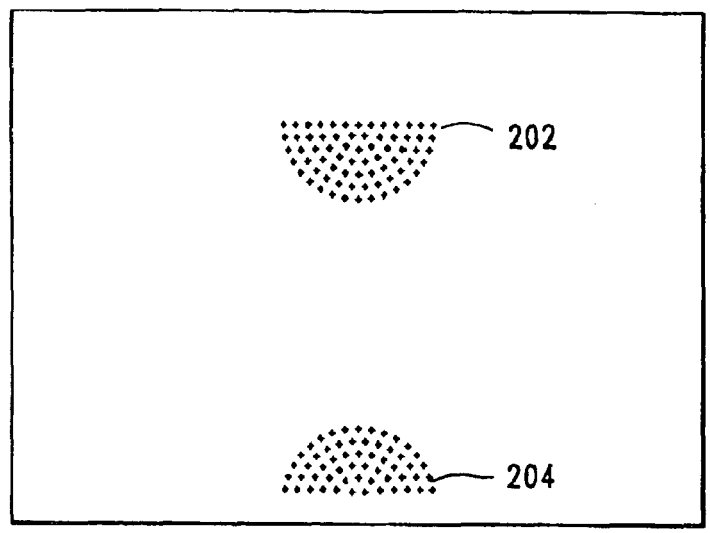
Figure 2C:
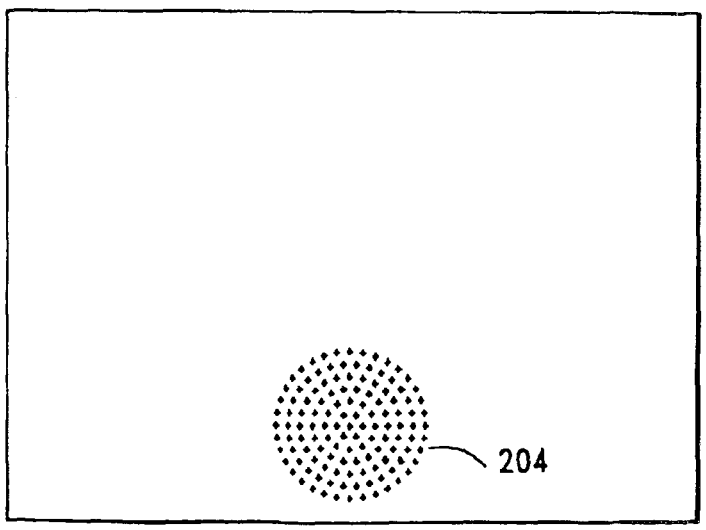

FIGS. 2a–2c are diagrams illustrating the output beam of FIGS. 1a–1c in an upper location 202 (path 108), an in between configuration, wherein the output beam appears at both upper location 202 and lower location 204 (paths 108 and 110), and a lower location 204 (path 110), respectively. FIGS. 2a through 2c show the beam footprints corresponding to the switch positions in FIGS. 1a–1c respectively. In FIG. 2a, for example, the beam is entirely on the filter, in FIG. 2b it is half incident on the filter and half incident on the mirror, and in FIG. 2c the beam is entirely incident on the mirror. At no time does the output beam traverse the space between the filter and the mirror—it simply disappears from the filter a bit at a time and appears on the mirror at the same rate. Thus, a noncontiguous filter and mirror can be used.

Figure 3:
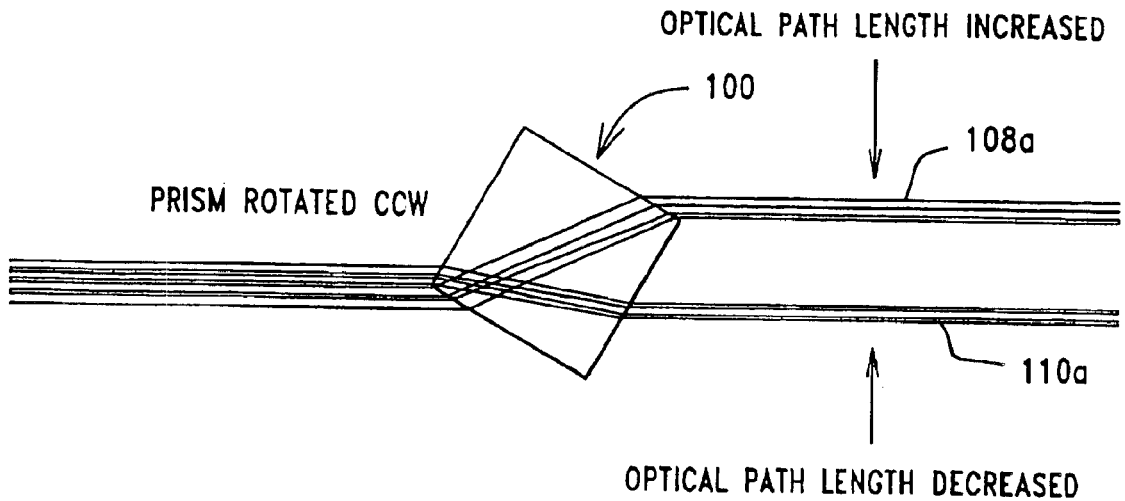
FIG. 3 is a side view of the beam switching element of FIG. 1 rotated to change the optical path of the upper and lower output beam.

FIG. 3 is a side view of beam switching element 100 of FIG. 1 rotated to change the optical path of the upper 108a and lower 110a output beams. FIG. 3 illustrates how the path length of each of the two paths (upper and lower) can be adjusted with respect to each other by rotating prism 100. This effect may be used, for example, to adjust the phase of the reflections from the filter and from the mirror so that they are equal, and hence produce no destructive interference for any wavelengths while the switch is half way between states (i.e., in the state illustrated in FIGS. 1b and 2b).

Figure 4:
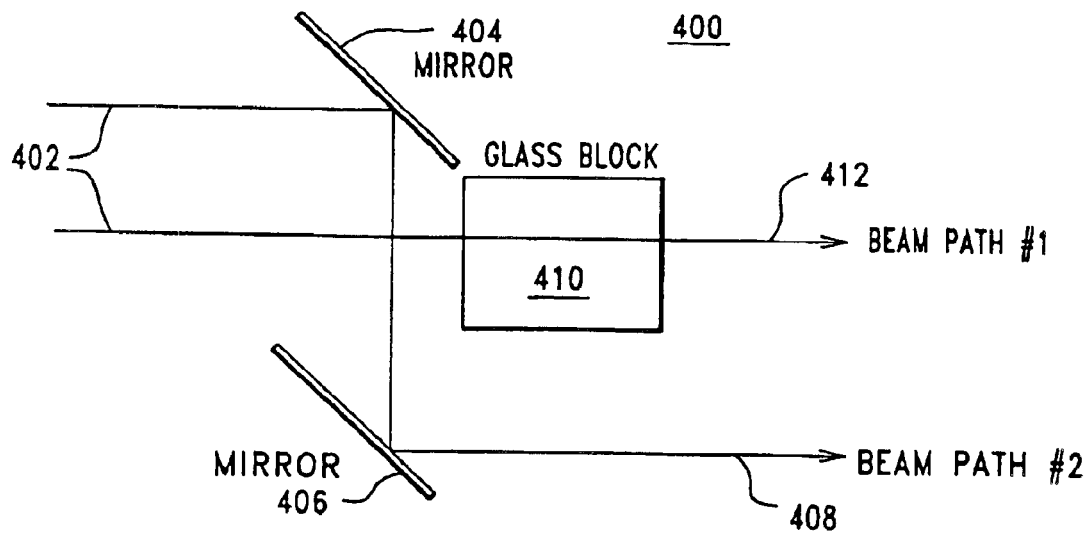
FIG. 4 is a side view of a second embodiment of beam switching apparatus according to the present invention.

FIG. 4 is a side view of a second embodiment 400 of beam switching apparatus according to the present invention. FIG. 4 shows another method of producing a similar discontinuous jump in the output beam when the input beam is moved a small distance continuously: In this figure, a series of mirrors are used instead of prism 100 of FIGS. 1–3. The purpose of glass block 410 is to adjust the optical path lengths of the two paths—to make them equal, for example. Small adjustments of the optical path of path #1 (in this example the upper position beam) can be achieved by small rotations of this glass block.

In operation, the apparatus of FIG. 4 works as follows. Input beam 402 in an upper position is incident on mirror 404, which reflects it toward mirror 406, and thence to lower path 408. When input beam 402 is moved downward to an in between position, part of the light reflects off of mirrors 404 and 406, and the other part passes through block 410. In this case, part of the light appears in upper path 412 and part of the light appears in lower path 408. Finally, when input beam 402 is moved to a lower position to be incident only upon block 410, all of the light appears in upper path 412. As in the embodiment of FIG. 1-3, no light ever appear between the upper and lower output paths. As in the embodiment of FIGS. 1–3, either the beam may be translated or the switching apparatus may be translated (or both).

Figure 5A:
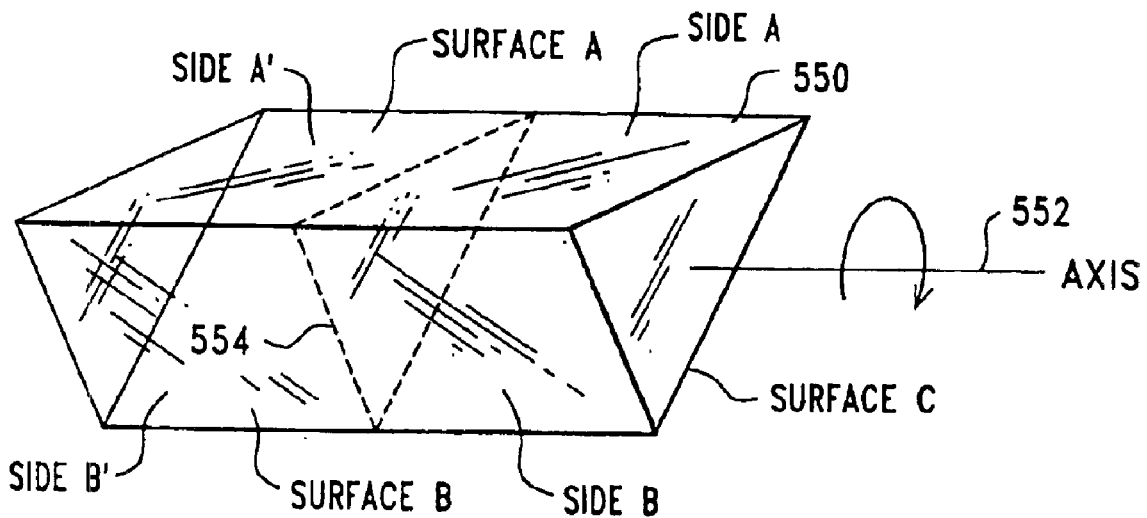
FIGS. 5a and 5b are an isometric view illustrating the construction of a beam switching element according to the present invention.
Figure 5B:
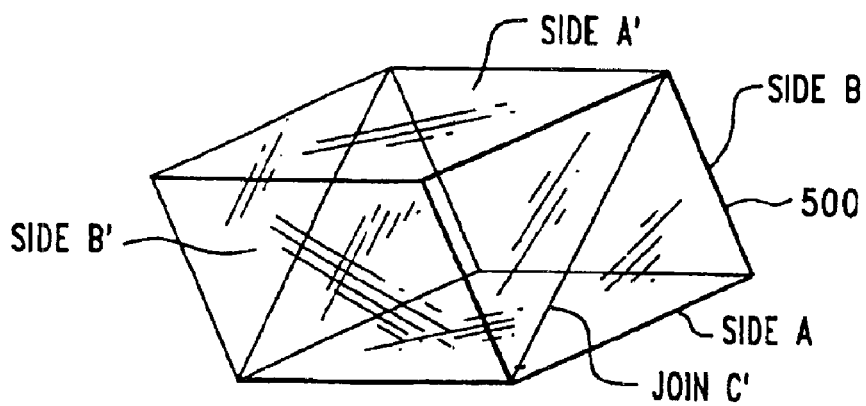

FIG. 5 is an isometric view illustrating the construction of a beam switching element 500 according to the present invention. Beam switching element 500 is constructed in such a manner as to create a prism with extremely accurately positioned parallel sides.

A triangular prism 550 having three adjacent surfaces A, B, and C and an axis 552 down the middle parallel to the three adjacent surfaces is cut at dotted line 554 across its axis 552 (preferably perpendicular to its axis). The two resulting portions are rotated and rejoined such that two of the surfaces A and B which were originally continuous surfaces now form opposite sides of a rectangular prism side A and side A', and side B and side B'. The third continuous surface C is now join C'.

What is claimed is:

1. Apparatus for switching an input beam of light between a first location and a second location distinct from the first location comprising:

an input beam of light;

a parallelogram prism positioned to intercept the input beam;

the prism including a corner formed by a first side of the prism and an adjacent side of the prism;

a translating element for translating the prism and the light beam to selected positions relative to each other;

wherein in a first selected position the input beam intercepts the first side of the prism, in a second position, the beam intercepts the first side and the adjacent side at the corner, and in a third position the beam intercepts the adjacent side, such that all of the light in each position appears in the first location or the second location.

2. The apparatus of claim 1 wherein the prism is a rectangular prism.

3. The apparatus of claim 1 wherein the prism was formed from a triangular prism having first, second, and third adjacent surfaces and an axis parallel to the three adjacent surfaces, wherein the triangular prism was cut across said axis, and wherein the two resulting portions were rotated and rejoined such that the first surface now forms opposite sides of the parallelogram prism, the second surface now forms opposite sides of the parallelogram prism, and the third surface is now joined.

4. Apparatus for switching a beam of light between a first location and a second location spaced apart from the first location comprising:

an input beam of light;

switch means for switching the input beam between the first and second locations, the switch means positioned to intercept the input beam;

means for translating the switch means and the light beam to selected positions relative to each other;

wherein in a first selected position all of the light appears in the first location, in a second position part of the light appears in the first location and part of the light appears in the second location and in a third position all of the light appears in the second location, and wherein none of the light appears between the first location and the second location in any of the positions.

5. The apparatus of claim 4 wherein the switch means comprises a parallelogram prism arranged such that the input beam intercepts a first of the sides in the first position, the first side and an adjacent side at a corner in the second position and the adjacent side in the third position.

6. The apparatus of claim 5 wherein the prism was formed from a triangular prism having first, second, and third adjacent surfaces and an axis down the middle parallel to the three adjacent surfaces, wherein the triangular prism was cut across said axis, and wherein the two resulting portions were rotated and rejoined such that the first surface now forms opposite sides of the parallelogram prism, the second surface now forms opposite sides of the parallelogram prism, and the third surface is now joined together.

7. The apparatus of claim 4 wherein the switch means comprises two mirrors arranged to sequentially intercept the input beam in the first position.

8. The apparatus of claim 7, further including a block of transparent material positioned to intercept the light between the apparatus and either the first location or the second location, the block applying a phase shift to the light passing through said block.

9. Apparatus for switching a beam of light between a first location and a second location spaced apart from the first location comprising:

an input beam of light;

a first mirror;

a second mirror; and a translating element for translating the mirrors and the light beam to selected positions relative to each other;

wherein in a first selected position the first mirror intercepts and reflects the input beam of light, and the second mirror intercepts and reflects the reflected beam from the first mirror forming an output beam, in a second selected position, the first mirror intercepts and reflects a portion of the input beam of light, the second mirror intercepts and reflects the beam from the first mirror, and the other portion of the input light passes adjacent to the first mirror, and in a third position, the input beam passes adjacent to the first mirror, such that all of the light in each position appears in the first location or the second location.

10. The apparatus of claim 9, further including a block of transparent material positioned to intercept the light between the apparatus and the first location or the second location, the block applying a phase shift to the light passing through said block.

11. The apparatus of claim 9, further including rotation apparatus for rotating the block to vary the phase shift applied by the block.

12. Apparatus for hitlessly tuning an optical add-drop filter comprising:

an input beam comprising channels of data;

a filter for selectively passing one or more channels of data and reflecting one or more channels of data;

a reflective surface for reflecting all of the channels of data; and a switch assembly for switching the input beam between the filter and the reflector, the switch assembly including switch means for switching the input beam between the first and second locations, the switch means positioned to intercept the input beam; and means for translating the switch means and the light beam to selected positions relative to each other;

wherein in a first selected position all of the light appears in the first location, in a second position part of the light appears in the first location and part of the light appears in the second location and in a third position all of the light appears in the second location, and wherein none of the light appears between the first location and the second location in any of the positions.

13. The apparatus of claim 12 wherein the switch means comprises a parallelogram prism arranged such that the input beam intercepts a first of the sides in the first position, the first side and an adjacent side at a corner in the second position and the adjacent side in the third position.

14. The apparatus of claim 13 wherein the prism was formed from a triangular prism having first, second, and third adjacent surfaces and an axis down the middle parallel to the three adjacent surfaces, wherein the triangular prism was cut across said axis, and wherein the two resulting portions were rotated and rejoined such that the first surface now forms opposite sides of the parallelogram prism, the second surface now forms opposite sides of the parallelogram prism, and the third surface is now joined together.

15. The apparatus of claim 12 wherein the switch means comprises two mirrors arranged to sequentially intercept the input beam in the first position.

16. The apparatus of claim 15, further including a block of transparent material positioned to intercept the light between the apparatus and either the first location or the second location, the block applying a phase shift to the light passing through said block.

* * * * *